Aug. 24, 1937.          L. D. STANLEY           2,090,818
MOTOR AND SPEED PULLEY MOUNT FOR A LATHE
Filed June 21, 1935
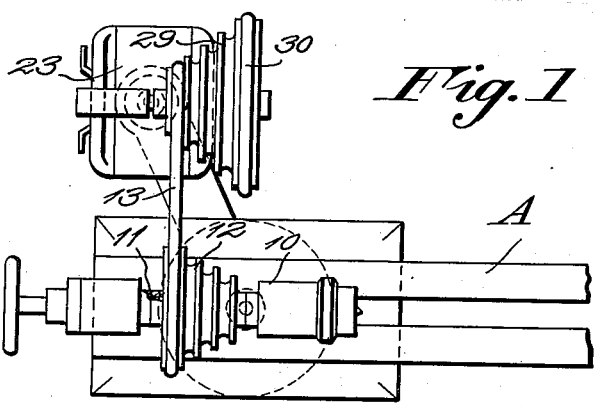
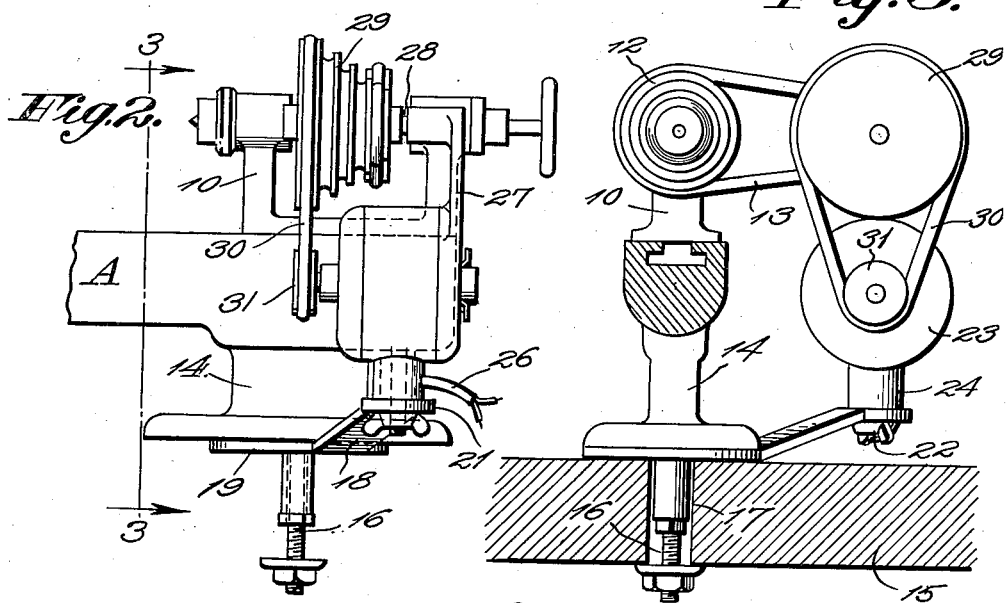
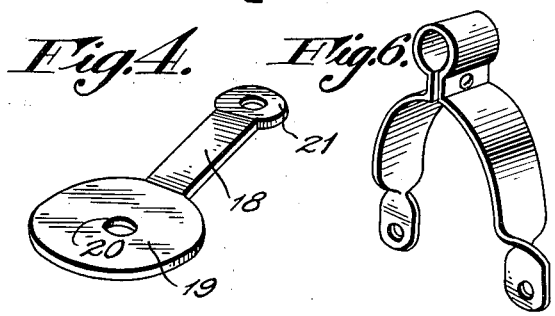
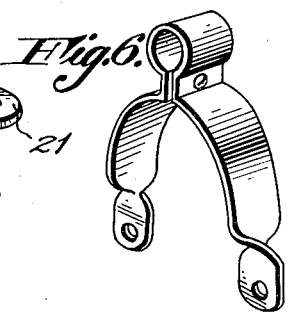
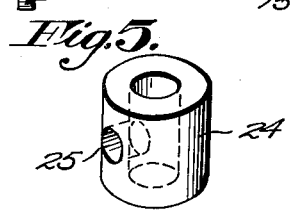
Lyle D. Stanley
INVENTOR Patented Aug. 24, 1937

2,090,818

UNITED STATES PATENT OFFICE 2,090,818

MOTOR AND SPEED PULLEY MOUNT FOR A LATHE

Lyle Dale Stanley, Dubuque, Iowa

Application June 21, 1935, Serial No. 27,783

1 Claim. (Cl. 82—28)

The invention relates to a motor and speed pulley mount for a lathe and particularly jewelers' or watchmakers' lathes.

The primary object of the invention is the provision of a mount of this character, wherein an electric motor can be supported with relation to a lathe and also a speed pulley so that when driving the said lathe shocks and vibrations incident to the running of the motor will be absorbed and thus relieving these from the lathe and wherein the belt wheel between the pulleys of the lathe and the motor may be shifted without necessity of lining up the lathe and motor and without the necessity of stopping the operation of the motor.

Another object of the invention is the provision of a mount of this character, wherein the speed of operation of the lathe can be altered accordingly to the requirements of work to be operated upon thereby, the mount being novel in construction.

A further object of the invention is the provision of a mount of this character, which is extremely simple in its construction, thoroughly reliable and effective in its operation, readily and easily applied to and removed from a lathe and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary top plan view of a lathe showing the mount constructed in accordance with the invention applied thereto.

Figure 2 is a rear elevation.

Figure 3 is a sectional view on the line 3—3 of Figure 2 looking in the direction of the arrows.

Figure 4 is a perspective view of one member of the mount.

Figure 5 is a perspective view of another member of the mount.

Figure 6 is a perspective view of a modified form of bracket for the speed pulley of the mount.

Similar reference characters indicate corresponding parts throughout the several views in the drawing.

Referring to the drawing in detail, particularly Figures 1 to 5 inclusive, A designates generally a portion of the bed of a lathe stand having adjustably connected therewith a head stock 10 for a live spindle 11, the latter being driven by a stepped cone pulley 12 for a belt 13, the bed A being formed with the usual standard 14 for rest upon a support such as a work bench 15 and this standard 14 is held fast upon the bench through the medium of a nut carrying screw 16, the same being passed through a suitable hole or opening 17 provided in said bench.

The mount constituting the present invention includes a flat metal member 18 in the form of a bracket having a disklike or circular shaped terminal 19 provided with a center opening 20 for accommodating the screw 16 when the said terminal 19 is located beneath the standard 14 and at rest upon the bench 15 so that the member 18 will be held secure. This member 18 is upwardly angled away from the terminal 19 and the other terminal thereof, which is of less size than the terminal 19 and circular as at 21, is elevated slightly above the plane of the bench 15. Engaged centrally in the terminal 21 is a fastener 22 for an electric motor 23, the fastener being passed through a resilient sleeve 24 which is interposed between the said motor and member 18 for absorbing shocks and vibrations when the motor is operating. The sleeve 24 has provided therein a clearance 25 for a current conductor 26 to the motor 23.

Formed with the casing of the motor 23 is an upstanding bearing 27 for a power shaft 28 having fixed thereto a stepped cone pulley 29 which has trained thereover the belt 13 and also a driving belt 30 which is trained over a power pulley 31 on the power shaft of the motor 23. By adjustment of the belt 13 the speed of operation of the lathe can be altered as should be apparent from Figures 1 to 3 of the drawing.

In Figure 6 of the drawing there is shown a slight modification wherein a bearing bracket 32 is detachably fastened to the casing of the motor 23 and constitutes a substitute for the bearing bracket 27 integrally formed with the said casing of the motor.

The resilient sleeve 24 interposed between the member 18 at the terminal 21 and the motor 23 functions as a shock absorber to relieve vibrations incident to the rotation of the motor 23 from the lather during the working thereof.

What is claimed is:

A power unit attachment for a watchmaker's lathe having a cone pulley, comprising a lathe, a metal bracket having straight ends and an angle portion between said ends and one of said ends being pivotally secured to the lathe but normally held from turning thereon and the second end of the bracket being elevated above said connected end, an electric motor having its casing formed with an upstanding bearing for a counter shaft that carries a cone pulley which is normally parallel with the cone pulley of the lathe and which is belted therewith and which is driven by the armature shaft of the motor, said motor casing having a depending pivot which passes through the elevated end of the bracket, a shock absorbing sleeve on the pivot between the motor casing and bracket, and adjustable means on the pivot for binding the same to the raised end of the bracket.

LYLE DALE STANLEY.